(12) United States Patent
Bennett et al.

(10) Patent No.: US 9,477,984 B2
(45) Date of Patent: Oct. 25, 2016

(54) SOCIAL MEDIA TRANSACTIONS SYSTEM AND METHODS

(71) Applicant: Soldsie, Inc., San Francisco, CA (US)

(72) Inventors: Chris Bennett, Miami, FL (US); Arrel Gray, Los Angeles, CA (US)

(73) Assignee: Soldsie, Inc., San Francisco, CA (US)

( * ) Notice: Subject to any disclaimer, the term of this patent is extended or adjusted under 35 U.S.C. 154(b) by 579 days.

(21) Appl. No.: 13/886,041

(22) Filed: May 2, 2013

(65) Prior Publication Data

US 2013/0297440 A1 Nov. 7, 2013

Related U.S. Application Data

(60) Provisional application No. 61/643,233, filed on May 5, 2012.

(51) Int. Cl.
*G06Q 30/06* (2012.01)
*G06Q 30/08* (2012.01)
*G06Q 50/00* (2012.01)

(52) U.S. Cl.
CPC ............. *G06Q 30/08* (2013.01); *G06Q 30/06* (2013.01); *G06Q 50/01* (2013.01)

(58) Field of Classification Search
CPC .............................. G06Q 30/06; G06Q 30/08
USPC ................................................ 705/26.1, 27.1
See application file for complete search history.

(56) References Cited

U.S. PATENT DOCUMENTS

| | | | |
|---|---|---|---|
| 7,669,123 B2 | 2/2010 | Zuckerberg et al. | |
| 8,219,500 B2 | 7/2012 | Galbreath et al. | |
| 8,352,859 B2 | 1/2013 | Zuckerberg et al. | |
| 8,401,009 B1 | 3/2013 | Dorsey et al. | |
| 8,407,285 B2 | 3/2013 | Cheah | |
| 2002/0004749 A1 | 1/2002 | Froseth et al. | |
| 2004/0022413 A1 | 2/2004 | Albus et al. | |
| 2012/0036043 A1* | 2/2012 | Koch | G06Q 30/0613 705/26.41 |
| 2014/0337175 A1* | 11/2014 | Katzin | G06Q 20/204 705/26.62 |

* cited by examiner

*Primary Examiner* — James Zurita

(57) ABSTRACT

A system and method for a sales transaction system (STS) in a social media network is presented. The invention provides a simple way to sell and purchase products in a social media environment allowing sellers to easily set up campaigns of a group of products they wish to sell. A member of the social network simply types a purchase direction statement (PDS) that is a keyword to indicate their desire to buy a listed product. The STS detects the PDS and invoices the buyer, updating the seller as to the completed payment, and directing them to ship to the appropriate address.

22 Claims, 14 Drawing Sheets

SOCIAL MEDIA TRANSACTIONS SYSTEM AND METHODS

CROSS-REFERENCE TO RELATED APPLICATIONS

This application claims the benefit of provisional application No. 61/643,233 of common inventorship filed May 5, 2012 under 35 USC 119(e).

FIELD OF INVENTION

The present invention relates to the use of social media to make sales transactions. Included are systems and methods for selling a product or a service directly in a social media network and more specifically to transaction systems and methods for facilitating sale transactions among social media members and merchants.

BACKGROUND OF THE INVENTION

The explosive growth of social media continues to accelerate. Social media networks currently include but are not limited to Facebook, GooglePlus, MySpace, Pinterest, Tagged, StumbleUpon, and Yelp. As of April 2013, Facebook has 1.06 billion monthly active users, 680 million mobile users, MySpace, 25 million users, Pinterest, 48.7 million users, Twitter, 500 million total users, more than 200 million active users (How Many People Use the Top Social Media, Apps & Services? Digital Marketing Ramblings . . . The Latest Digital Marketing Tips, Trends and Technology, posted on Apr. 3, 2013 by Craig Smith, http://expandedramblings.com/index.php/resource-how-many-people-use-the-top-social-media/). Within these networks, a user can link and communicate with other users. These connections represent a network of people who are also potential customers.

U.S. Pat. No. 7,669,123, to Zuckerberg et al., discloses a method for displaying a news feed in a social network environment. The method includes generating news items regarding activities associated with a user of a social network environment and attaching an informational link associated with at least one of the activities, to at least one of the news items, as well as limiting access to the news items to a predetermined set of viewers and assigning an order to the news items.

U.S. Pat. No. 8,219,500, to Galbreath et al., discloses an online social network in which users of the online social network control who may view their personal information and who may communicate with the user.

U.S. Pat. No. 8,352,859 to Zuckerberg et al., discloses a method to display a news feed in a social media network environment. A social networking system generates news items regarding activities associated with a user of the a social network environment. The social networking system may also attach an information link associated with at least one of the activities to at least one of the news items, limit access to the news items to a predetermined set of viewers, and assign an order to the news items.

Currently individual users, businesses, and organizations, on becoming a member of a social media network, may create pages with personal, company, or organization information. Members may post links to their web pages where products are sold but sales transactions capability is limited. One such system that provides sales capability is Ecwid, Inc. (144 West D Street, Suite 103, Encinitas, Calif. 92024). This system is based on copying HTML code, called E-commerce widgets, created by Ecwid to the company's website or Facebook profile page. Because the Ecwid system requires copying HTML code to be entered into the seller's site or social media page, a user must be skilled in computer programming and/or website design to use the Ecwid system. A second system is a marketplace application program offered by Facebook, Inc. (1601 Willow Rd., Menlo Park, Calif. 94025) where users may post products for sale. In this system a member viewing a product and wishing to buy the product must contact the seller to arrange payment and provide to the seller shipping information.

What is needed in the art is a sales transaction system that easily and seamlessly integrates with a social media platform. The present invention provides such a sales transaction system being a simple program and method that enables merchants or social media members to easily sell products in a social media network. Through the present sales transaction system product pictures and details are uploaded to a profile page, a member viewing and wishing to buy the product posts a purchase command or purchase direction statement (PDS), the sales transaction system invoices the buyer, and sends confirmation of payment and shipment information back to the seller.

SUMMARY OF THE INVENTION

An aspect of the present invention is to provide a program and method for merchants to offer products for sale in a social media network.

Another aspect of the present invention is to provide a program and method for a social media network member to purchase a product from a merchant within the social media network.

Another aspect of the present invention is to provide a program and method for a social media member to create an account in a sales transaction system to automatically process payment for an item purchased from a merchant on a social media network.

Another aspect of the present invention is to provide a program and method for a social media network member, through a sales transaction system, to act as a merchant, posting an item for sale to other members.

Another aspect of the present invention is to provide a method to update a web feed with information pertaining to an item purchased from a merchant or other member, such information being an item purchased and/or comment on that item by the member.

Another aspect of the present invention is to prompt the user as to whether they would like to update the web feed with purchase information.

Another aspect of the present invention is to provide a system to auction products in a social media network.

Others aspects of this invention will appear from the following description and appended claims, reference being made to the accompanying drawings forming a part of this specification wherein like reference characters designate corresponding parts in the several views.

Figure 1:
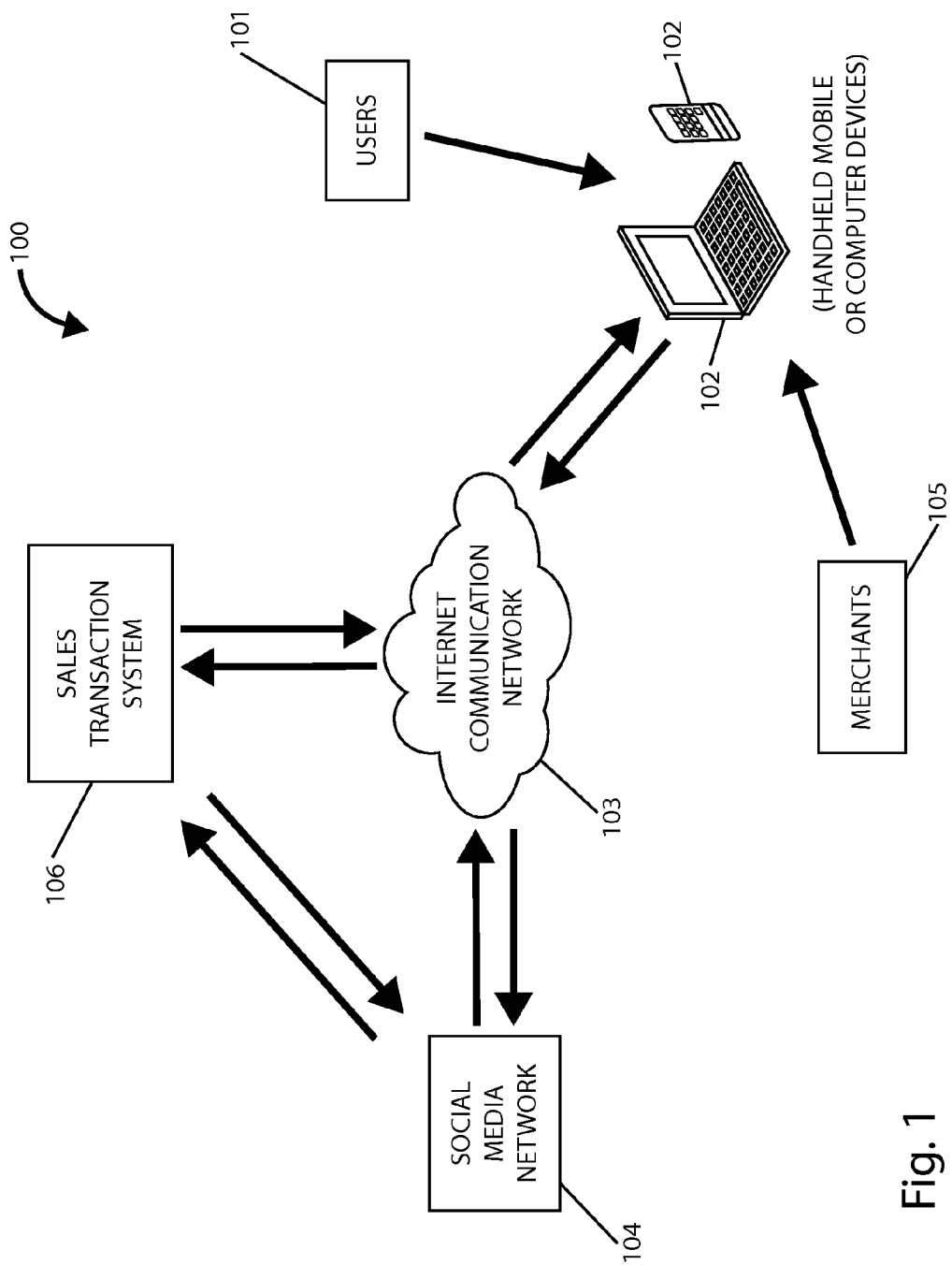
FIG. 1 is a block diagram illustrating a sales transaction system for goods or services on a social media network according to the present invention.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE INVENTION

The claimed method and system is useful for providing ability to sell and purchase items in a social media network. The disclosure below provides description of the various embodiments of the claimed method and system.

In this disclosure a number of terms and abbreviations are used. The following definitions are provided.

The term member refers to an individual person or device user registered with a social media network or other program.

The term merchant refers to a company or group whose primary purpose is to sell goods or services, and may be any entity that offers a product for sale.

The term product refers to a good or service that may be listed for sale.

The term good refers to an item that may be purchased.

The term service refers to an act that is provided by another person such as a lawn mowing service, dry cleaning service, or a hair styling service.

The term social network service refers to an internet based computer program for social networks or social relations among people who, for example, share interests, activities, backgrounds, or real-life connections. A social network consists of a representation of each user or member, often known as a profile, his/her social links, and a variety of additional services. The social network services referred to herein are web-based and provide means for users to interact over the Internet, such as e-mail and instant messaging. Social networking sites allow users to share ideas, pictures, posts, activities, events, and interests with people in their network which can be a web feed.

The term web feed, also known as a news feed, refers to a data format for providing members with frequently updated content.

The term profile refers to personal information about a member or merchant provided to a social network or other service by the member or merchant.

The term page refers to a destination within the social network or other service that may contain profile or other status information pertaining to a member or merchant, provided to the service by the member or merchant.

The term campaign refers to a group of product offerings created by a member or merchant.

The term community refers to a group of members who are connected via a social network service.

The term social media refers to a means for interactions among people in which they create, share, and exchange information and ideas in virtual communities and networks. Social media has been defined as a group of Internet-based applications that build on the ideological and technological foundations of Web 2.0, and that allow the creation and exchange of user or member-generated content. (Kaplan Andreas M., Haenlein Michael, (2010), Users of the world, unite! The challenges and opportunities of social media, Business Horizons, Vol. 53, Issue 1, pg 61) Social media depends on mobile and web-based technologies to create highly interactive platforms through which individuals and communities share, co-create, discuss, and modify user, or member-generated content.

The term fan refers to a member who is connected to a merchant or other member.

The term transaction refers to an agreement, communication, or movement carried out between a member, or buyer, and a merchant, or seller, to exchange an asset for payment.

The term invoice refers to a direction to pay a specified amount for a product or service.

The term computer network refers to a type of communication between data processing nodes for the purpose of data communications. It is a communications network in which the end points are computers or mobile devices. The interconnection of computers is accomplished with a variety of networking hardware and wired and/or wireless signals. Two devices are said to be networked, when a process in one device is able to exchange information with a process in another device. The best known computer network is the internet.

The term link refers to a segment of text or a graphical item that serves as a cross-reference between parts of a hypertext document or between files or hypertext documents.

The term sales transaction system (STS) refers to the present invention and is a computer based program and is a simple platform to allow sale and purchase of products from social media networks.

The term purchase direction statement (PDS) is a word or phrase entered by a social media network member wishing to purchase a product listed by a merchant or another member on the social media network.

Now referring specifically to FIG. 1, FIG. 1 illustrates the social media sales transaction system (STS) of the present invention 100. Users 101 connect via handheld mobile or other computer devices 102 through an internet or other communication network 103 to a social media network 104. Users become members of the social media network which consists of hardware and software used to host the social media network. Merchants 105 in the same manner may become members of the same social media network 104. An internet based sales transaction system of the present invention 106, through the use of hardware and software, provides a program for merchants and or members to list products for sale on the social media network. Further, users or merchants may become members of the sales transaction system 106 creating accounts to store product, invoice, payment, and shipping information so that product payment and shipment may be processed automatically through the use of the STS program 106.

Figure 2:
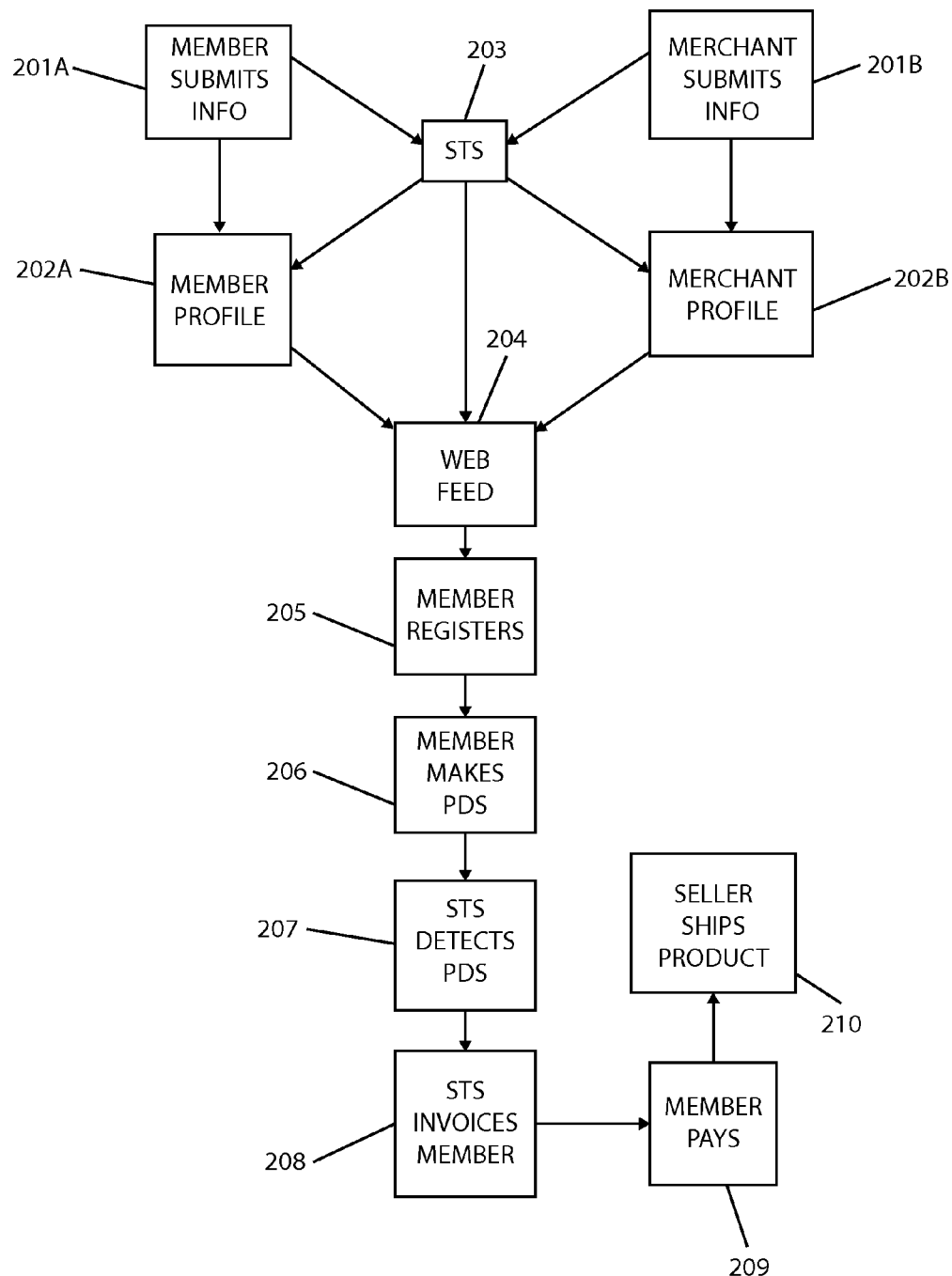
FIG. 2 is a flow diagram illustrating the method of using a sales transaction system for purchasing a product from a merchant on a social media network according to the present invention.

Now referring to FIG. 2, FIG. 2 is a flow diagram illustrating a method for purchasing a product from a merchant on a social media network according to the present invention. First, a user submits personal information to the social media network to become a member 201A. With this information a member profile is created by the social media network 202A. A member may also register with the sales transaction system (STS) by submitting at least an email address 203. A merchant, which may be a company or other organization, in the same manner submits information to the social media network 201B, and a profile is created 202B. Status data, consisting of a comments script, pictures, or web page links, submitted by the member, merchant, or organization members of the social media network is displayed on a web feed page 204 according to member preferences. A merchant or member seller wishing to post a product for sale registers with and utilizes the STS program 203 to list a product on its profile 201B or 202B, and this product is likewise displayed on the web feed page 204. A member wishing to purchase the product posted, if not already registered with the STS, registers 205 by entering at least an email address. Once registered, the member enters a purchase direction statement (PDS) 206 in a comment line on the web feed 204 or profile 201B or 202B. The PDS is a word or phrase, in the present example the keyword "sold" is used, but any keyword term may be utilized. The STS detects the PDS in the web feed 207 and sends the member an invoice for the product via email 208. The member pays for the product and the seller is notified by the STS and ships the product 209.

Figure 3:
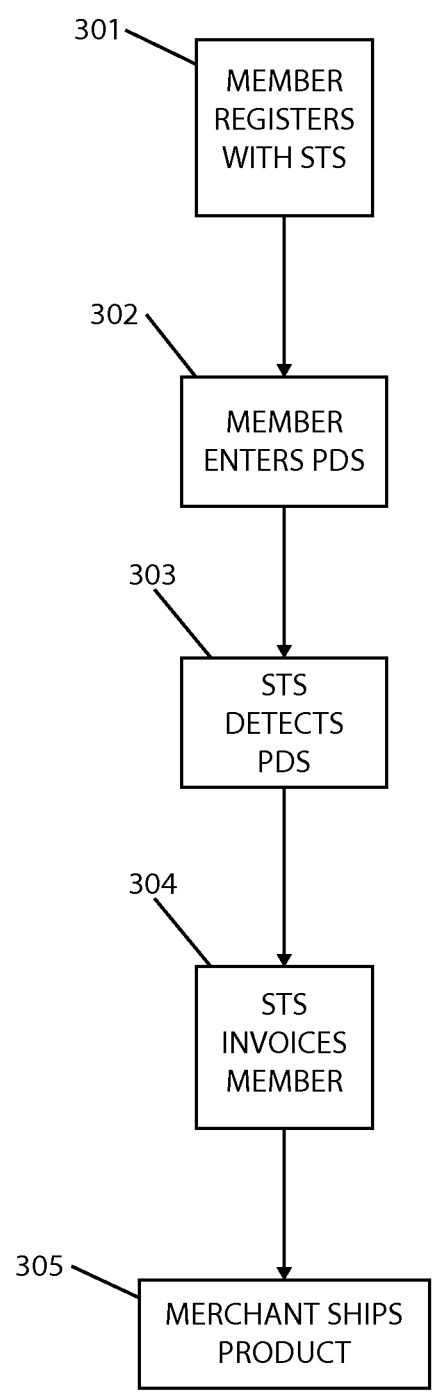
FIG. 3 is a flow diagram illustrating a method used by a member on a social media network to purchase a product from a merchant according to a first embodiment of the present invention.

Now referring to FIG. 3, FIG. 3 is a flow diagram illustrating a method for purchasing a product on a social media network according to a first embodiment of the present invention. A member, having already entered information into a social media network and the network having created a profile page as in FIG. 2, 201A, may register with a sales transaction system (STS), entering at least email contact information 301. Other information including shipping address and/or account information may also be supplied to the STS. A member having viewed a product listed by the merchant on a profile, FIG. 2202B, or web feed, FIG. 2 204, according to the method presented FIG. 2, enters a purchase direction statement PDS in a comment line under the desired product 302. The sales transaction system detects the purchase direction statement 303. If the member has already registered payment information, payment for the item desired will be directed to the account indicated in the user registration information or if no payment information is registered the STS invoices the member via email 304. Alternately, a member may be prompted to register email and/or payment and shipping information by the STS in the reply to the member's PDS in the comments section of the product. The STS sends to the merchant, confirmation of payment, and the merchant ships the product to the member 305 according to shipping address provided to the STS by the member or from the member directly.

Figure 4:
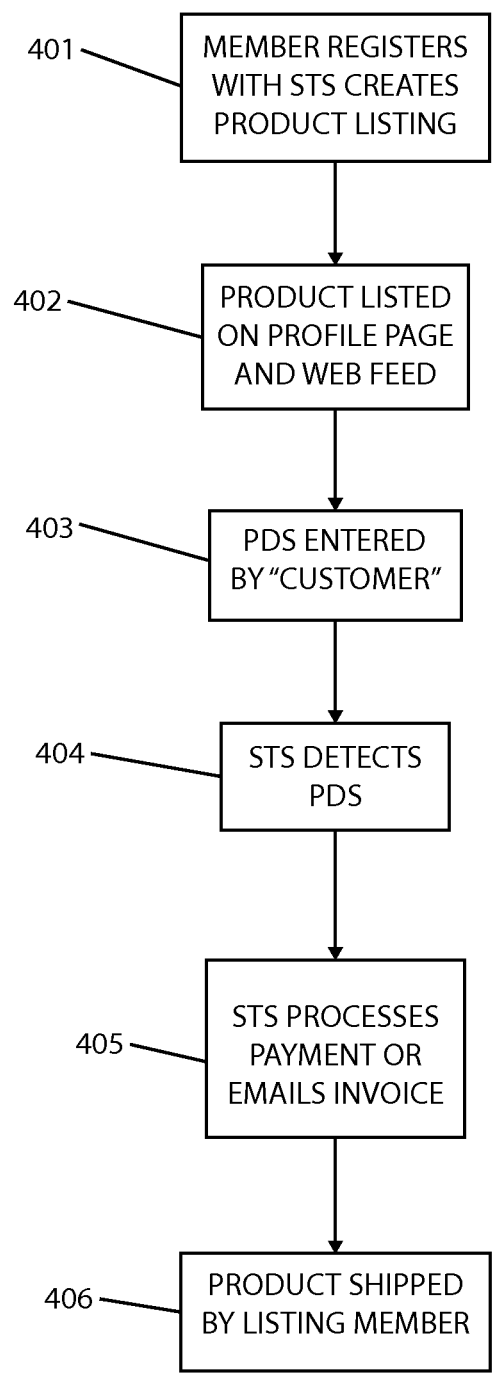
FIG. 4 is a flow diagram illustrating a method for purchasing a product from another member on a social media network according to a second embodiment of the present invention.

Now referring to FIG. 4, FIG. 4 is a flow diagram illustrating a method for a member or merchant to list a product to be purchased by another member on a social media network according to a third embodiment of the present invention. As in FIG. 2, a user, being an individual or merchant, enters personal information on a social media network (201A, 201B) and a profile for that member or merchant is created (202A, 202B). A member or merchant registers with and uses the STS program to create a product listing on their profile page 401 becoming a listing member. The product is viewed from the listing member's profile or web feed by another member of the social network 402. Another member being a customer, wishing to purchase said product, registers with the STS and enters a PDS in the comments section under the product 403. The PDS is detected by the sales transaction system 404. If the customer payment information is registered with the sales transaction system program, payment is automatically processed by the STS 405, if not the customer is sent an invoice by the STS via email. If the purchasing member payment information is not registered, the purchasing member may pay via electronic means or register with the sales transactions system program at which point the payment is caused to be processed by the STS program. The listing member is notified of payment and ships the product to the purchasing member 406.

Figure 5:
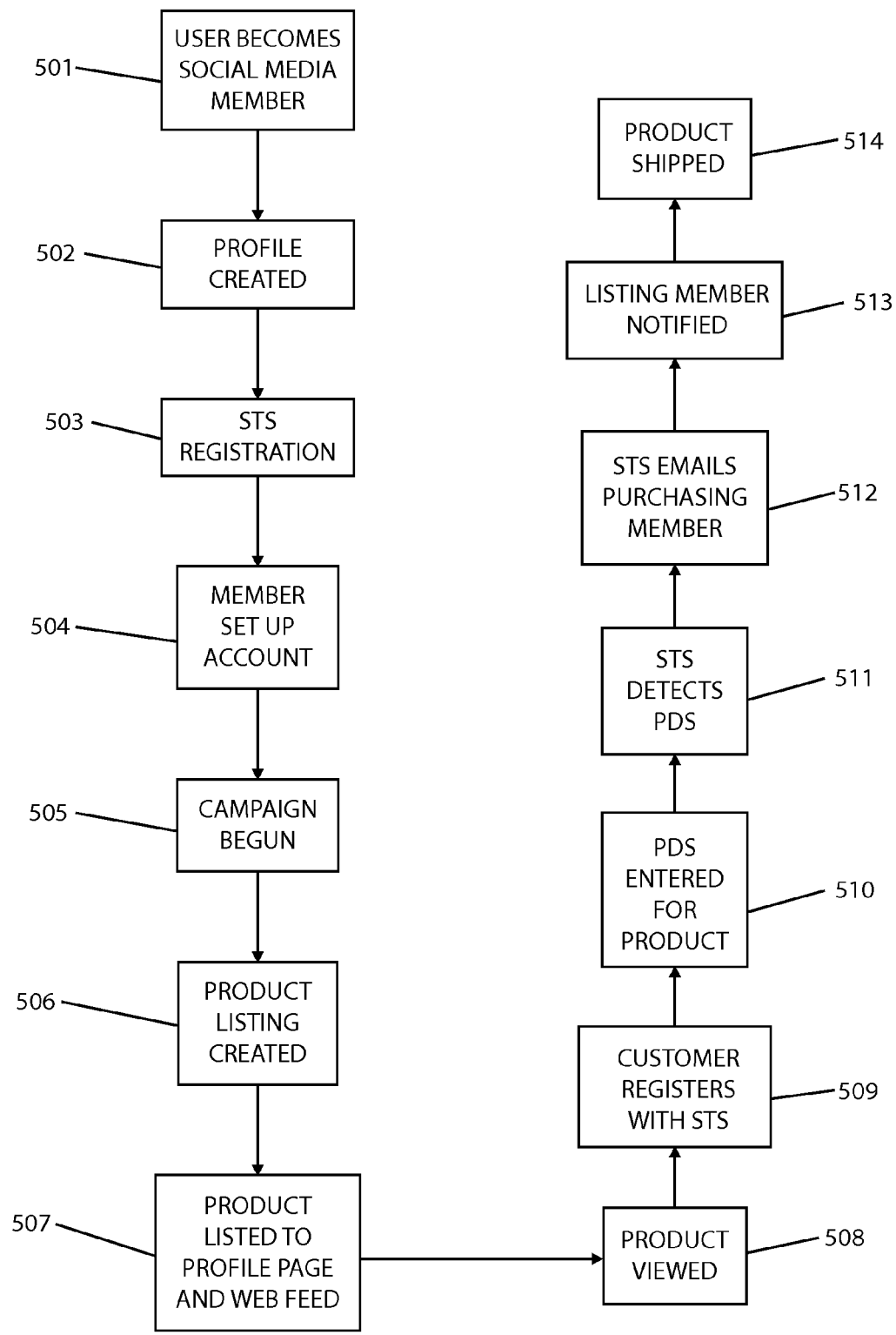
FIG. 5 is a flow diagram illustrating a method for a merchant to sell a product on a social media network according to the first embodiment of the present invention.

Next referring to FIG. 5, FIG. 5 illustrates, in a flow diagram, the sales transaction system program used by a product listing member or merchant to list a product for sale. A user, being an individual, business, or organization connects to a social media network and enters personal information to become a member 501. A profile is generated for that member 502. The member connects to a sales transaction system and registers with the sales transaction system entering social media network profile page information such that the sales transaction system can upload their program to that page 503. The member sets up a payment method which may be a bank routing number or other online payment account service such as PayPal 504. The sales transaction program allows the user to start a new campaign 505. The campaign consists of a group of products wishing to be sold by the member. A product listing is created 506 wherein photo of the product is uploaded along with identifying data including name, price, options of size for instance, number of products available, availability of personalization or gift wrapping, whether the personalization or extra gift wrapping will incur an extra fee, shipping price, custom order information, and/or if product is of limited production 506. More than one product can be listed in a campaign. The member schedules at what date and time the campaign should be posted to the profile page and the campaign is posted to the profile page and therefore web feed 507. The aforementioned steps may be completed in any order such that the member may first submit product information and then designate payment and social media page information. After the campaign is listed to the profile page, other members, being potential customers or purchasing members, connected to the product listing member may view products from the member profile page or web feed page 508. The customer wishing to buy a specific product registers with the STS 509. The customer types a purchase direction statement (PDS) in the comment section under the desired product 510. This PDS may consist of a key word that is a purchase direction for example, "sold" or "buy", the purchasing member's email and desired product options, including for example size, color, quantity and personalization desired. The sales transaction system program detects in the comments section the purchase direction statement 511. Information detected can include the purchase direction key word such as "sold" or "buy", purchasing member email, size of product desired, quantity of product desired, any personalization desired, a direction to gift wrap, and/or multiple shipping addresses. The purchasing member is sent an email by the sales transaction system program 512 prompting the purchasing member to make the payment and/or register payment and shipping information with the sales transaction system for future purchases. If the purchasing member customer is already registered the payment may be processed and shipment information passed automatically to the listing member. The listing member is notified that the payment has been processed 513. The listing member then ships the product to the purchasing member being able to access shipping information and print shipping labels from the sales transaction system program 514.

Figure 6:
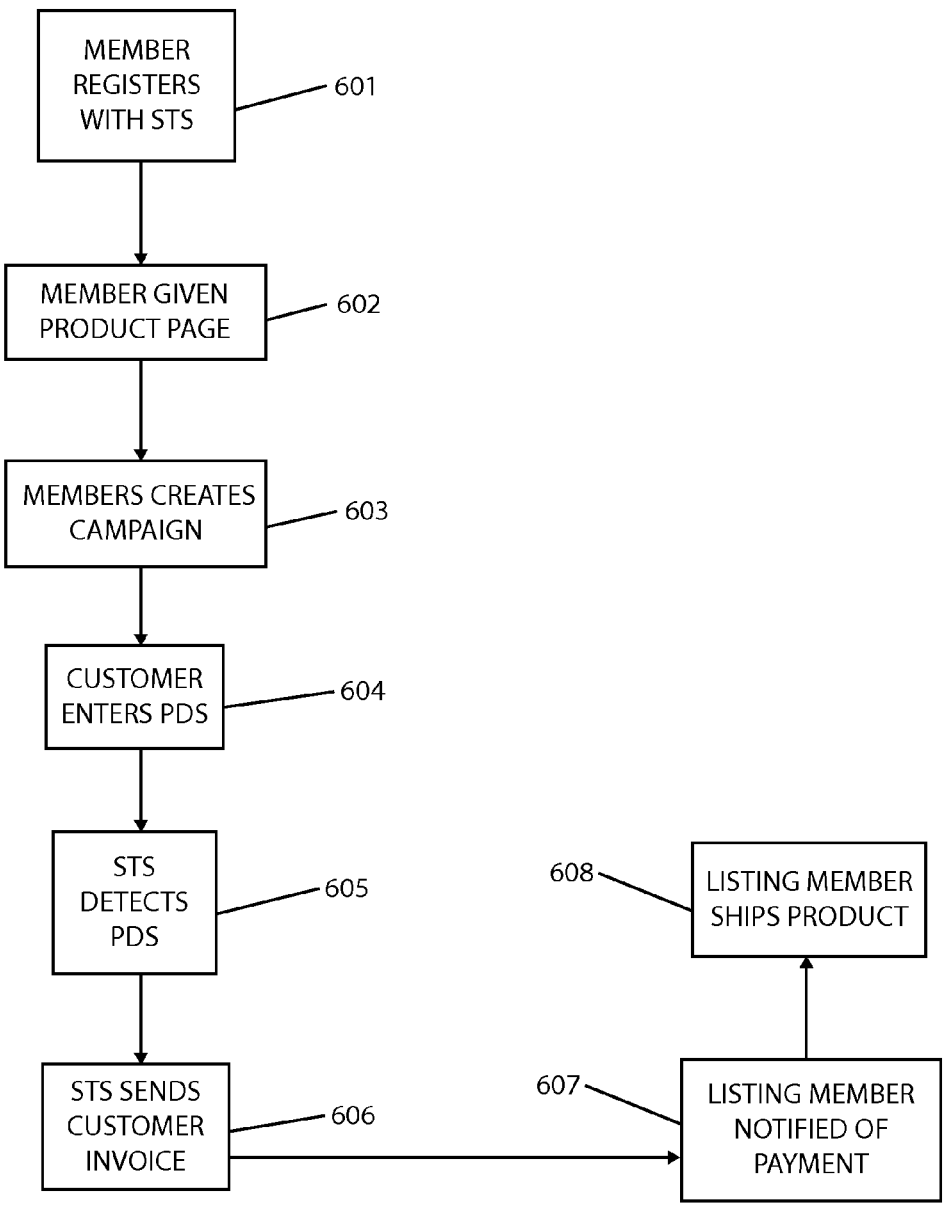
FIG. 6 is a flow diagram illustrating a method for posting a product for sale according to the first embodiment of the present invention.

Next referring to FIG. 6, FIG. 6 is a flow diagram illustrating the invoice tracking feature of a sales transaction system program of the present invention. First, a user registers with a sales transaction system, becoming a member, by providing personal information including social network account and payment information 601. The member is given a product page within his/her social network account to track products listed, purchases of, payments for, and shipment of products 602. The member creates a campaign, listing one or more products for sale on their social network profile page 603. Another member being a customer registers with the STS and may enter a purchase direction statement (PDS) indicating their desire to buy the product 604. The sales transaction system detects the purchase direction statement (PDS) on the profile page of the member 605. The PDS sends the customer an email with an invoice directing the customer to the merchant's payment service 606 or charges account based on payment information given during registration. Once the customer has paid for the item STS detects the transaction and updates the sale status on the member's product page 607. The listing member ships the product utilizing labels that can be created within the member's STS product page 608.

Figure 7:
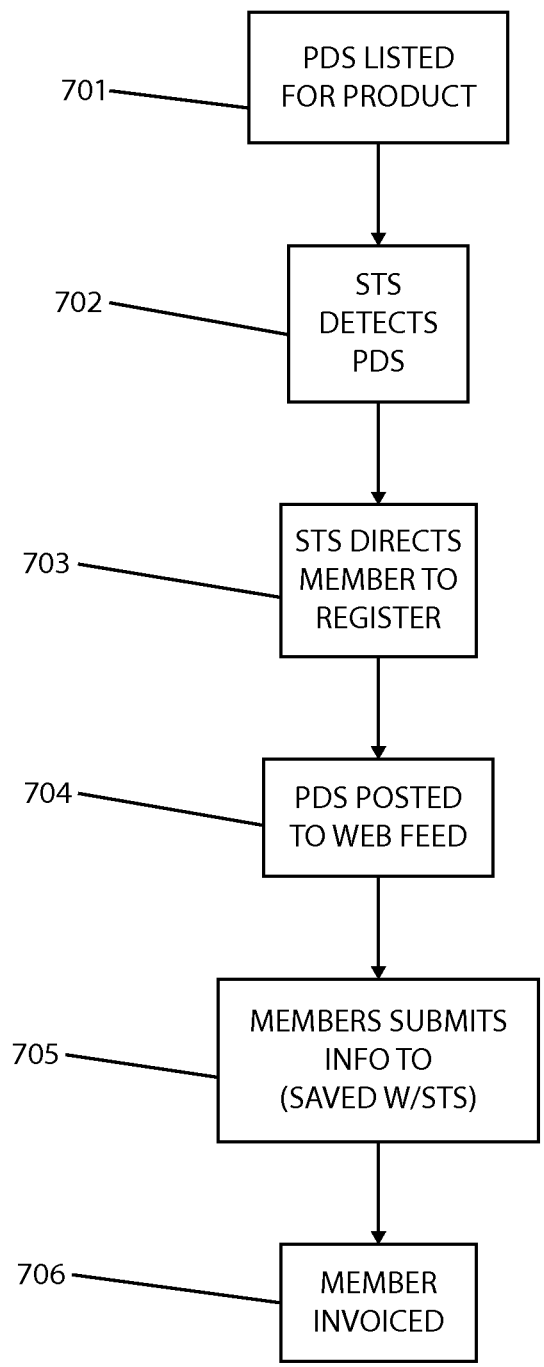
FIG. 7 is a flow diagram illustrating the method for a member to register with the sales transaction network.

Next referring to FIG. 7, FIG. 7 is a flow diagram illustrating user registration in the sales transaction system. In step 1, a social media network member types a PDS in the comment section of a product he/she wishes to purchase 701 as directed in the product description. This PDS is detected by the STS 702. The STS may reply with a direction in the comment section prompting the member to open a link and securely enter their email to complete the purchase 703. According to the member's social media network settings a member ordering on a product may view these comments in the web feed on the social media network or they may be sent to the member in an email 704. Alternately in the product description there may be a link which the member may use to go to a sales transaction system registration page. The member opens the link that is a page in the STS program and enters his/her email address 705. This email address is used by the STS to send an invoice to the member 706. This member name and email address information is saved within the STS system. If the same member types another PDS an email can automatically be sent with an invoice for the product desired. The information may also include additional member personal information such as payment information and shipping address so that payment could be automatically processed and the seller could be directed to ship to the member address.

Figure 8:
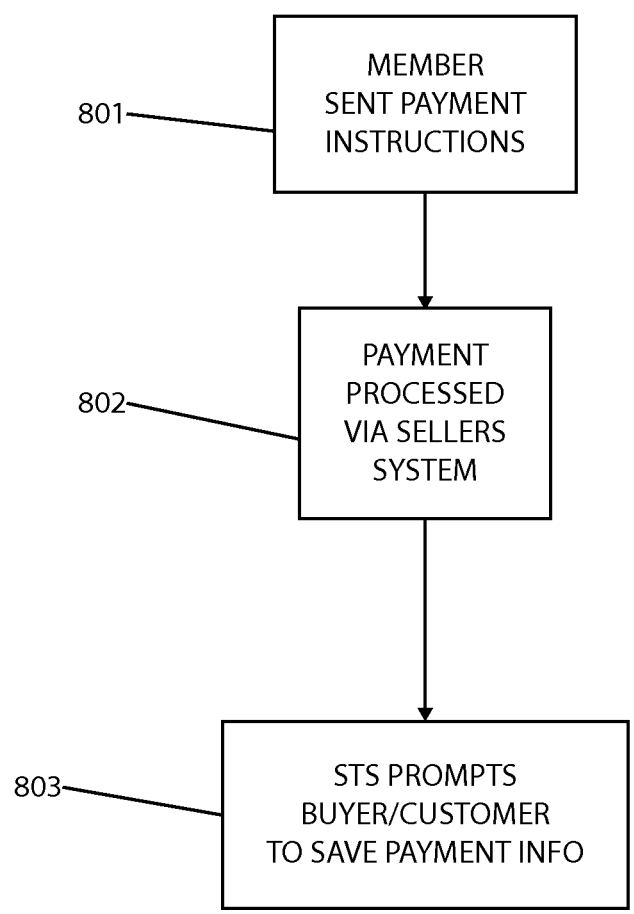
FIG. 8 is a flow diagram illustrating the method a member pays for a product.

Next referring to FIG. 8, FIG. 8 is a flow diagram of the STS payment process. When a member types a PDS in the comments section under a product, the member is sent an email that is an invoice directing the member to pay through the merchant's payment service for the product desired 801. After the payment is processed by the member through the seller's payment system 802, the STS sends an email to the member prompting the member to save payment information in the STS program for use in future purchases 803. If the same member types another PDS in a comment section under a product, the STS detects this PDS, and using the previously saved information processes payment to the seller for the member then sends a receipt or payment confirmation email to the sender.

Figure 9:
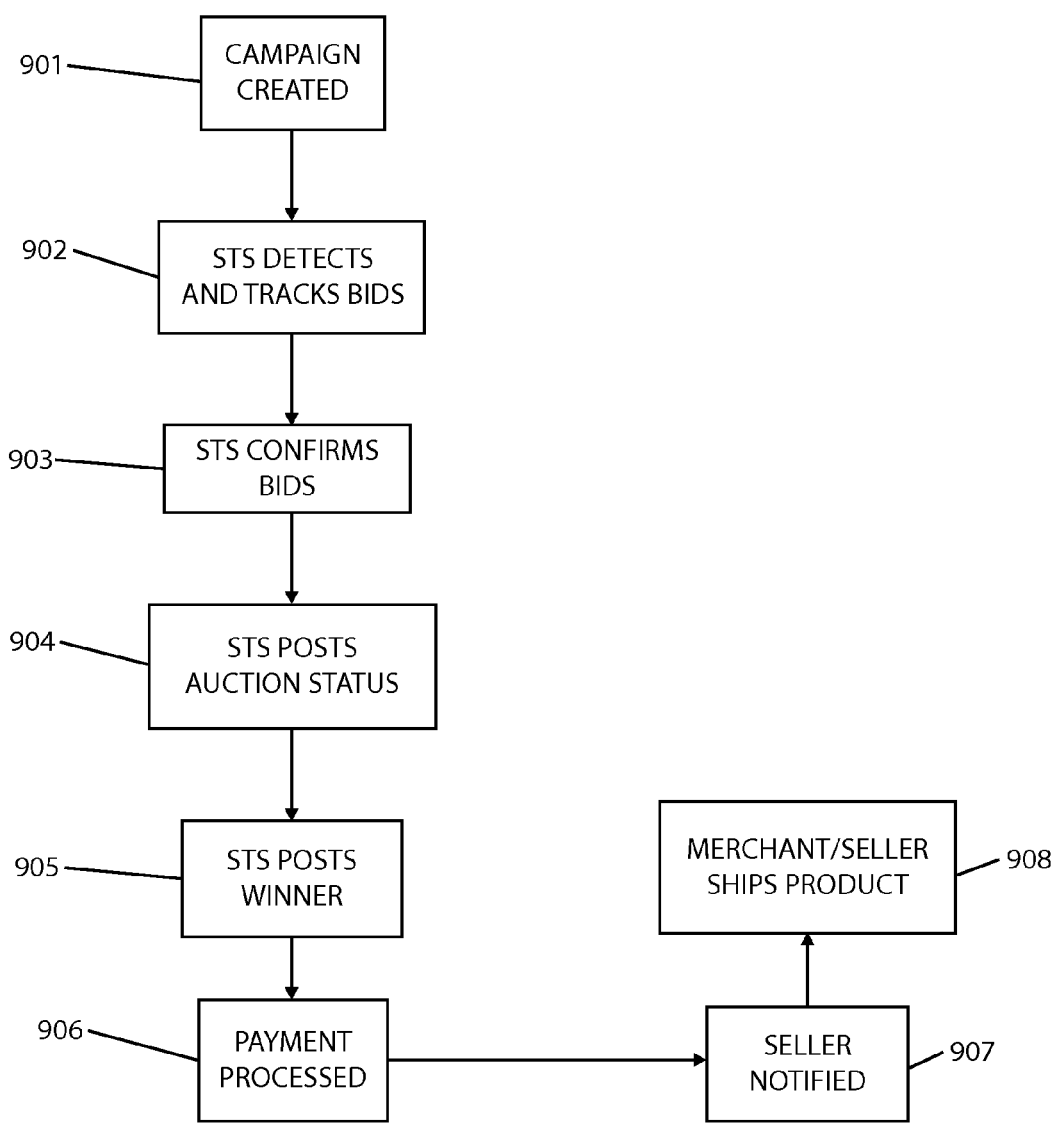
FIG. 9 is a flow diagram illustrating the method for auctioning products via a social media network according to a third embodiment of the invention.

Next referring to FIG. 9, FIG. 9 is a flow diagram representing the third embodiment of the invention that is a system to hold a virtual auction for a product on a social media network. Using the STS program a member or merchant, having already created an account with the STS program, creates a product listing campaign as described in FIG. 6, 901. This product listing however, contains instead of set price information, the price the auction should start at, a bid increment value, and the duration of the auction desired. The STS detects and tracks the bids entered for the product 902. The STS sends a confirmation reply in the form of a comment on behalf of the auctioning member or merchant 903. According to the member's social media network settings a member bidding on a product may view these comments in the web feed on the social media network or they may be sent to the member in an email. The STS post status comments on behalf of the auctioning member or merchant alerting bidders for example to the amount of time left to bid on a product 904. After the close of the bids for a product, the STS program posts in the comment section of a product, the winner of the auction 905. The winner is sent a payment invoice by the STS 906 and the winner processes the payment. If payment information is already saved the STS may process the payment automatically on behalf of the winner. The STS sends to the auctioning member or merchant the winner's information, 907, and the merchant ships the product 908.

Figure 10:
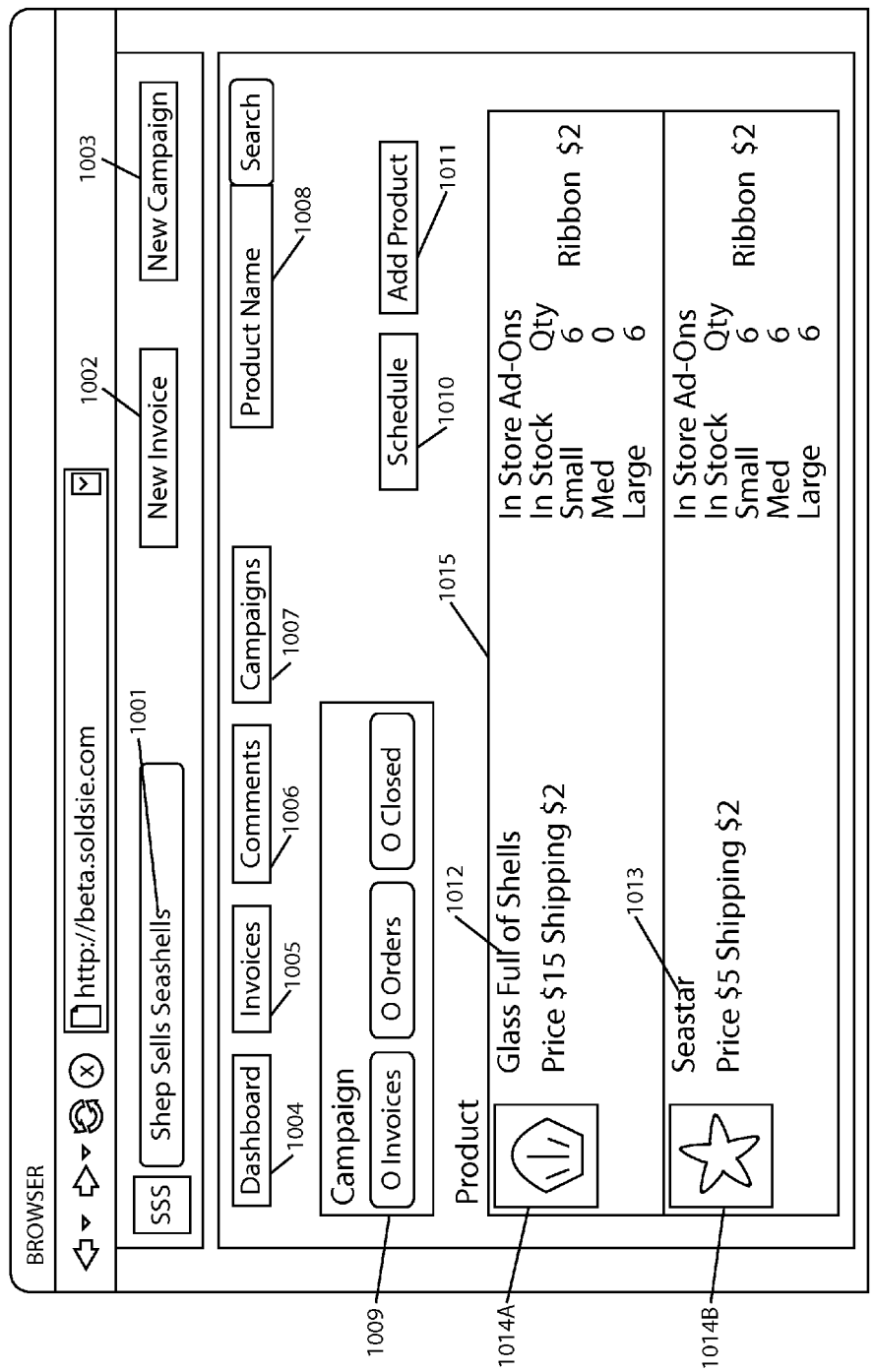
FIG. 10 is an exemplary screen shot illustrating the layout for the STS program campaign screen.

Next referring to FIG. 10, FIG. 10 is an exemplary screen shot illustrating the layout for the STS program campaign screen. A member wishing to sell products in a social media network registers with the STS of the current invention and is given an account consisting of a software program for tracking products, payments, and customer shipping information. This software program creates pages in a web browser for the client. A campaign is created using the software with a visual layout as depicted in FIG. 10. The client name is shown at the top left of the screen 1001. The client is given links to create a new invoice 1002, or a new campaign 1003. Pages within the client account include the Dashboard 1004, Invoices 1005, Comments 1006, and Campaigns 1007. In this illustration a campaign page is shown. The capability is given to search the client information for a specific previously entered product 1008. Since this is a new campaign no invoices, orders, or closed orders are indicated, 1009. A link are given to schedule the campaign when addition of products is completed 1010. A link is provided to add a new product 1011. Two products have been added to this campaign example, a glass of shells 1012, and a sea star 1013. A picture of each product may be uploaded 1014AB. Details including price, shipping costs, quantity in stock, size, and add-ons may be inserted for each product.

Figure 11:
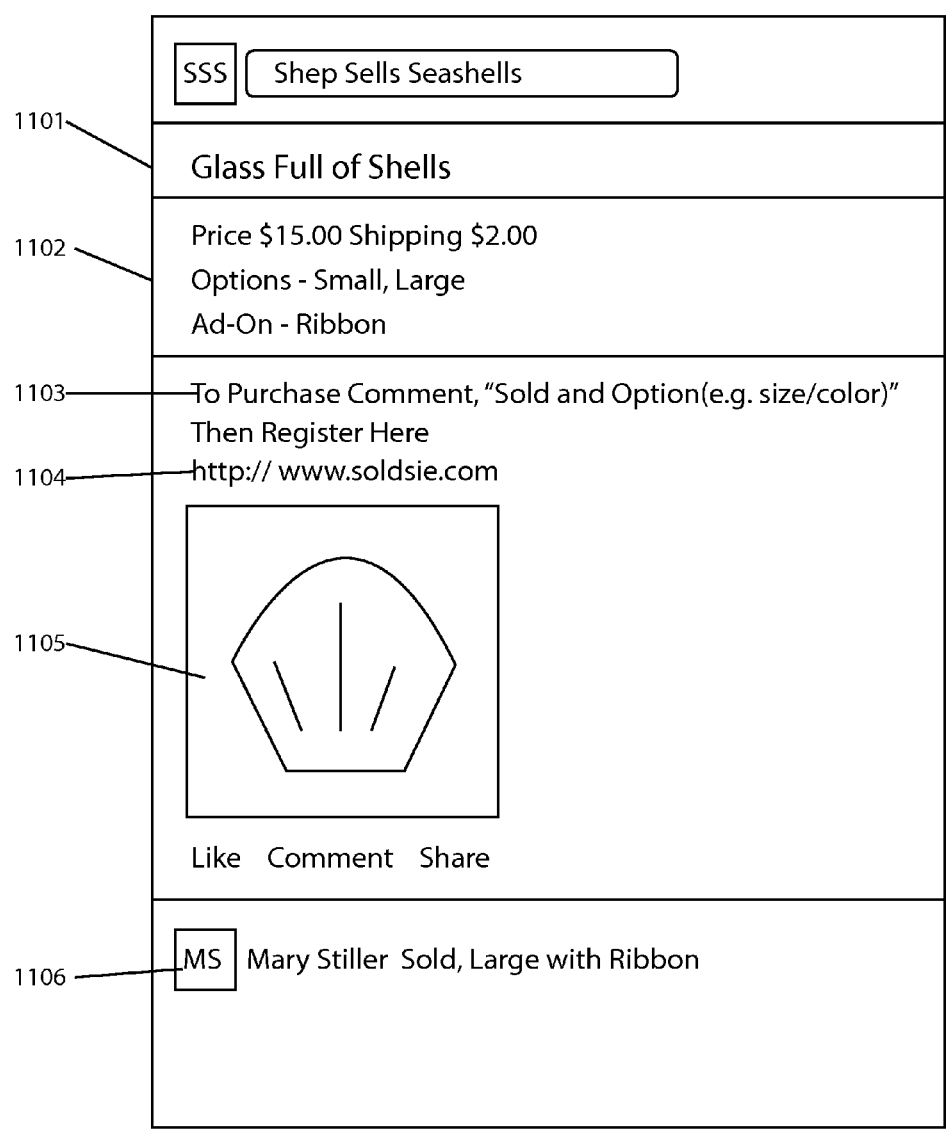
FIG. 11 is an exemplary screen shot illustrating the layout of a product listing for the STS program.

Next referring to FIG. 11, FIG. 11 is an exemplary screen shot illustrating the lay out of a product ad listing on a merchant's profile page or web feed produced using the sales transaction system (STS) program of the current invention. The glass full of shells product entered by the client is posted to the profile and/or web feed page 1101. The product name, amount, shipping cost, size options, and add-ons specified by the clients are listed in the ad 1102. Directions are given under the products listing in text format as to how a social media member may proceed if wishing to purchase the product 1103. A link is given to register with the STS 1104. A picture of the product is shown with links to like, comment, or share the product 1105. Below the picture, in the comment section, a member has posted a PDS and desired option 1106.

Figure 12:
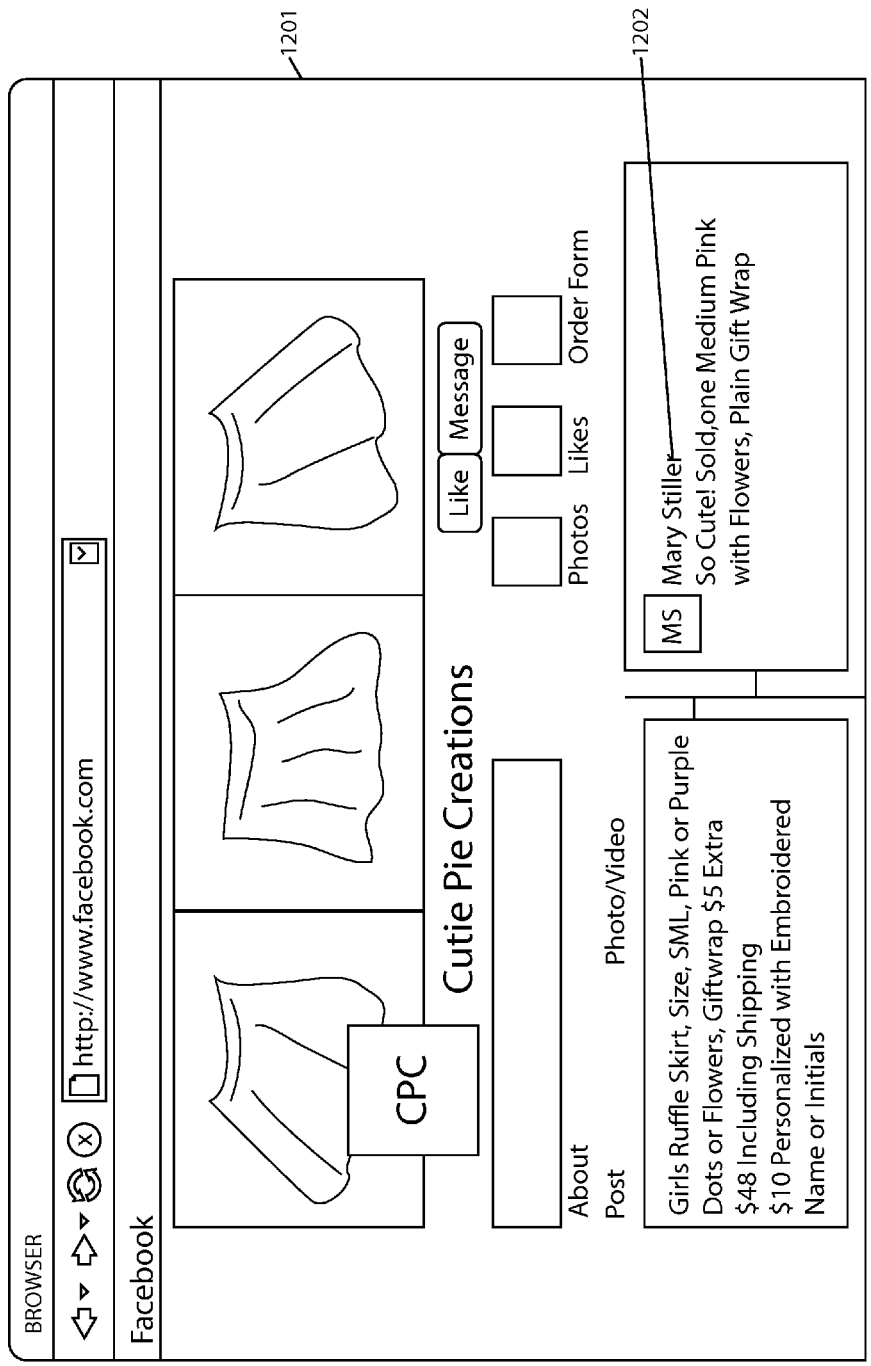
FIG. 12 is an exemplary screen shot illustrating a merchant's profile page showing a product posted using the STS program of the current invention.

Next referring to FIG. 12, FIG. 12 is an exemplary screen shot illustrating a merchant's profile page with a product listing created using the STS of the current invention 1201. A post by a social media member containing a PDS is shown 1202.

Figure 13:
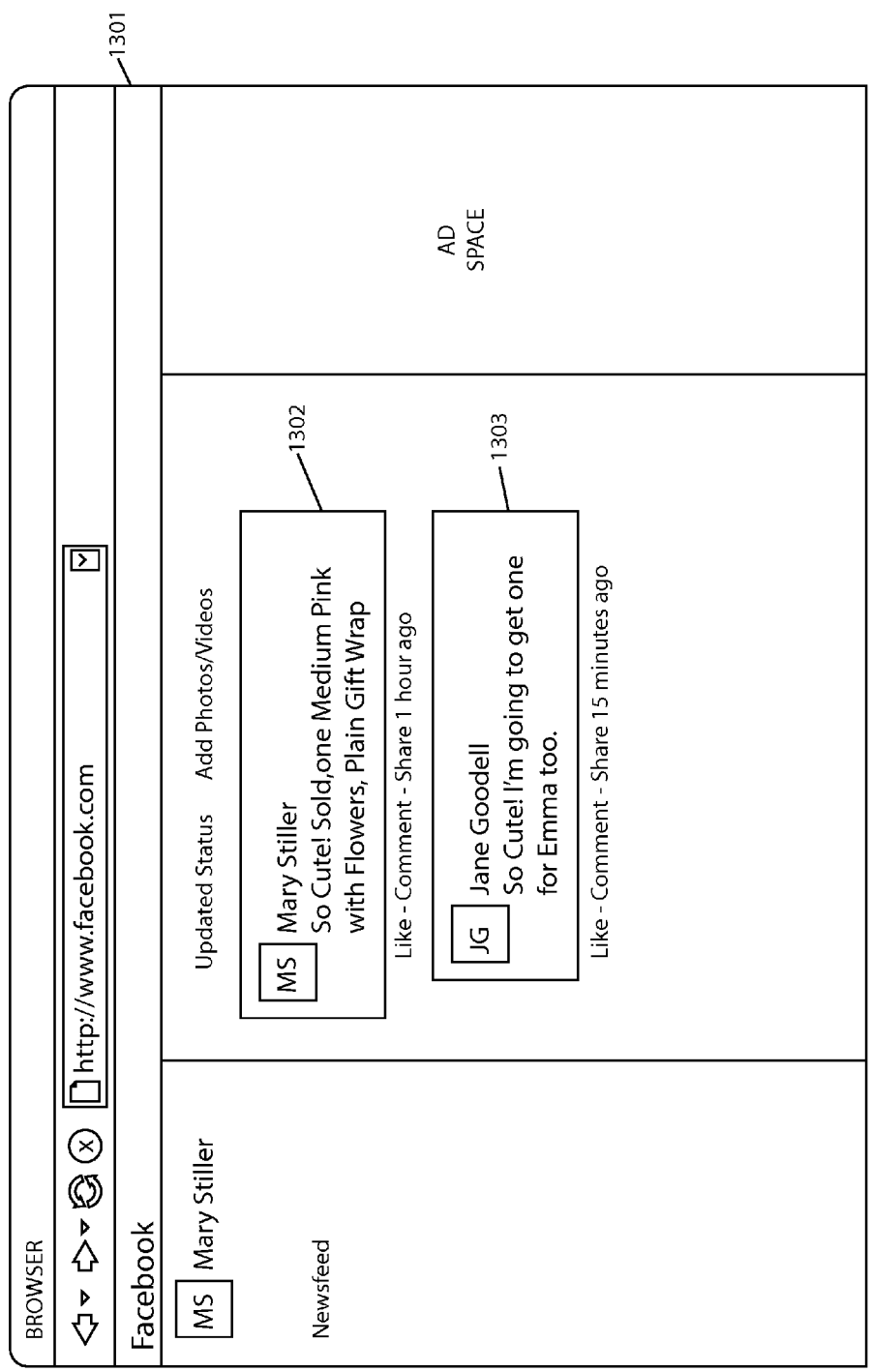
FIG. 13 is an exemplary screen shot illustrating the layout of a web feed page showing comments on a product listed for sale using the STS of the current invention.

Next referring to FIG. 13, FIG. 13 is an exemplary screen shot illustrating the layout of a web feed page of a social media network showing comments on a product listed for sale using the STS of the current invention 1301. On the web feed page, the comment posted on the merchant page by a buyer is shown on the web feed page 1302. Other members have also posted comments on the product 1303.

Figure 14:
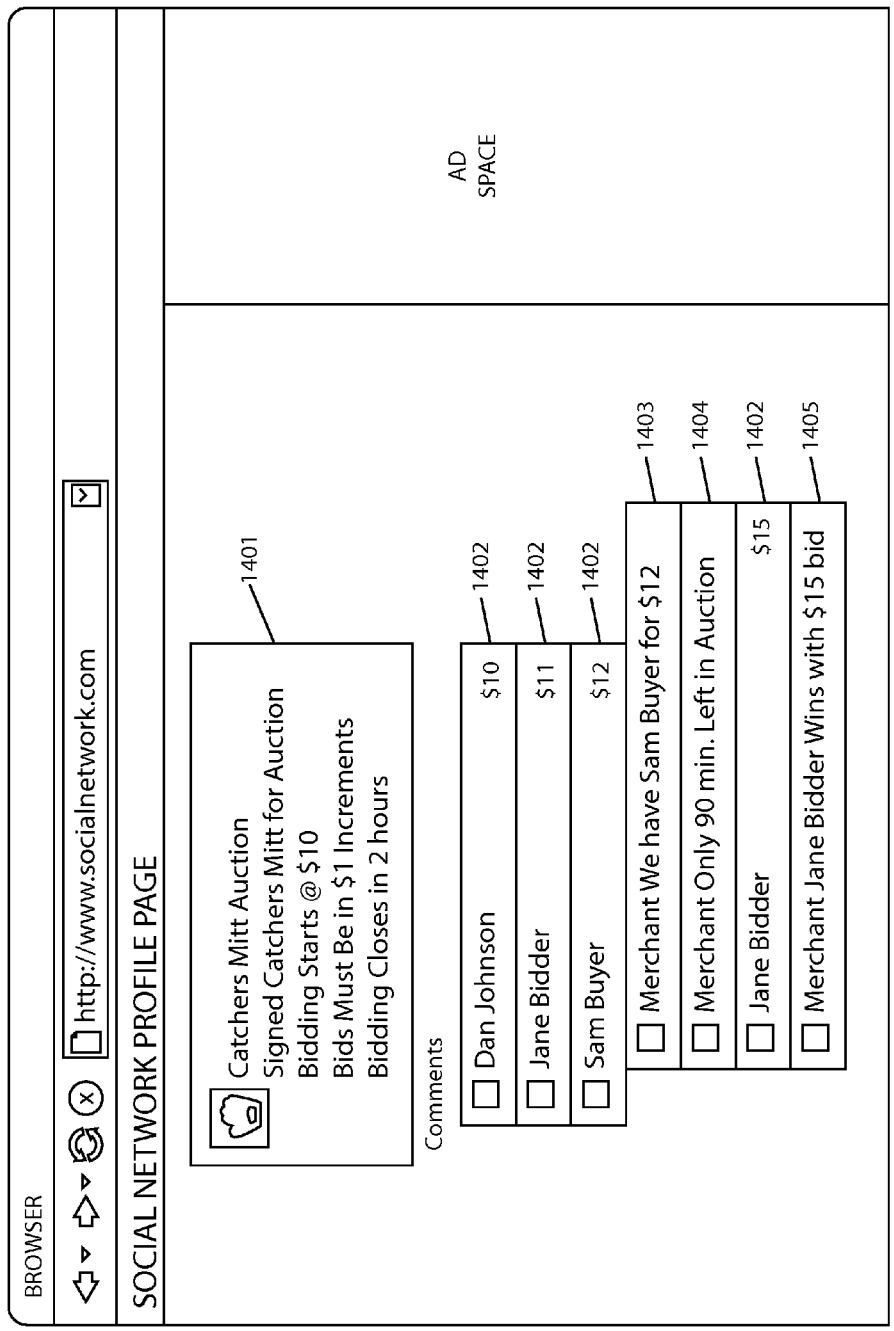
FIG. 14 is an exemplary screen shot illustrating the layout for an auction on a member's social media profile page.

Finally, referring to FIG. 14, FIG. 14 is an exemplary screen shot illustrating the layout for an auction for a product on a member's profile page illustrating the third embodiment of the present invention. A picture of the product and product description is given along with details for the auction 1401. Other members of the social media network connected to the seller have listed bids for the product 1402. The STS posted an update on the auction for the merchant 1403. The STS posted a status of the auction for the merchant 1404. The STS posts the winner of the auction for the merchant 1405.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A non-transitory processor-readable medium storing code representing instructions to be executed by a processor, the code comprising code to cause the processor to:
   access a request (1) from a member of a social network, and (2) sent to a server of the social network, to initiate a member portion of a transaction associated with a product offered by a merchant via the social network;
   match the request to a purchase direction statement, the purchase direction statement being agnostic to the product;
   send to a device of the member, in response to the match, a signal representing transaction information associated with the product and enabling the member to complete the member portion of the transaction; and
   send to a device of the merchant an indication of the request, the indication including contact information of the member.

2. The non-transitory processor-readable medium of claim 1, wherein the code to cause the processor to send to the device of the merchant includes code to send, is at a first time and to the device of the merchant, the code further comprising code to cause the processor to:
   send, at a second time after the first time and to the device of the merchant, a signal representing completion of the member portion of the transaction.

3. The non-transitory processor-readable medium of claim 1, the code further comprising code to cause the processor to:
   receive from the device of the merchant a signal indicating a first inventory value associated with the product; and
   send, to the device of the merchant, in response to the match, a signal indicating a second inventory value associated with the product, the second inventory value being different than the first inventory value.

4. The non-transitory processor-readable medium of claim 1, wherein the product has a first characteristic and not a second characteristic, the code further comprising code to cause the processor to:
   detect, in response to the match and based on the request, (1) a portion of the request indicating the second characteristic, and (2) the request not indicating the first characteristic; and
   send, in response to the detection, a signal enabling the member to complete the member portion of the transaction associated with (1) the product, and (2) the first characteristic.

5. The non-transitory processor-readable medium of claim 1, wherein the member of the social network is a first member, the request is sent to the server of the social network such that a second member of the social network accesses via a device of the second member a representation of the request, the second member of the social network having an association within the social network with the first member, the association being selected by at least one of the first member or the second member.

6. The non-transitory processor-readable medium of claim 1, wherein the member is a first member, the request from the first member is a first request, the code further comprising code to cause the processor to:
   send, to the device of the first member and in response to the first request, a second request to publish data via the social network indicating the first request such that a representation of the data is accessed via the social network and at a device of a second member associated with the first member.

7. The non-transitory processor-readable medium of claim 1, wherein the purchase direction statement is (1) defined at least in part by the merchant, and (2) sent to the server of the social network such that a representation of the purchase direction statement is accessed at the device of the member and prior to the request from the member of the social network being sent to the server of the social network.

8. The non-transitory processor-readable medium of claim 1, the code further comprising code to cause the processor to:
   receive, at a first time, prior to accessing the request, and from the device of the merchant, a first signal representing permission to access the request; and
   receive, at a second time after the first time, prior to accessing the request, and from the device of the member, a second signal representing permission to access the request.

9. The non-transitory processor-readable medium of claim 1, wherein the request is entered via the device of the member in a comment input section of (1) a web feed of the social network, or (2) a web page of the social network and defined at least in part by the merchant.

10. The non-transitory processor-readable medium of claim 1, wherein the request is a first request, the product is a first product, the transaction is a first transaction, and the transaction information is first transaction information, the code further comprising code to cause the processor to:
 access a second request (1) from the member of the social network, and (2) sent to the server of the social network, to initiate a member portion of a second transaction associated with a second product offered by the merchant via the social network, the second product offered by the merchant being different than the first product offered by the merchant;
 match the second request to the purchase direction statement;
 send to the device of the member, in response to the matching of the second request to the purchase direction statement, a signal representing second transaction information associated with the second product and enabling the member to complete the member portion of the second transaction; and
 send to the device of the merchant an indication of the second request, the indication of the second request including contact information of the member.

11. The non-transitory process-readable medium of claim 1, wherein the request includes the purchase direction statement and at least one of a size, quantity, or color associated with the product, the code further comprising code to cause the processor to:
 detect within the request the at least one of the size, quantity, or color associated with the product to produce a purchase option identifier,
 the transaction information associated with the product including the purchase option identifier.

12. A non-transitory processor-readable medium storing code representing instructions to be executed by a processor, the code comprising code to cause the processor to:
 access a request (1) from a member of a social network, and (2) sent to a server of the social network, to initiate a member portion of a transaction associated with a product offered by the merchant via the social network;
 match the request to a purchase direction statement, the purchase direction statement being agnostic to the product; and
 send, in response to the match and to a device of the member, a signal representing transaction information associated with the product, the signal representing the transaction information enabling the member to complete the member portion of the transaction without viewing a web page separate from the social network.

13. The non-transitory processor-readable medium of claim 12, the code further comprising code to cause the processor to:
 receive from a device of the merchant a signal indicating a first inventory value associated with the product; and
 send, to the device of the merchant and in response to the match, a signal indicating a second inventory value associated with the product, the second inventory value being different than the first inventory value.

14. The non-transitory processor-readable medium of claim 12, wherein the member of the social network is a first member, the request is sent to the server of the social network such that a second member of the social network accesses via a device of the second member a representation of the request, the second member of the social network having an association within the social network with the first member, the association being selected by at least one of the first member or the second member.

15. The non-transitory processor-readable medium of claim 12, wherein the member is a first member, the request from the first member is a first request, the code further comprising code to cause the processor to:
 send, to the device of the first member and in response to the first request, a second request to publish data via the social network indicating the first request such that a representation of the data is accessed via the social network and at a device of a second member associated with the first member.

16. The non-transitory processor-readable medium of claim 12, wherein the purchase direction statement is (1) defined at least in part by the merchant, and (2) sent to the server of the social network such that a representation of the purchase direction statement is accessed at the device of the member and prior to the request from the member of the social network being sent to the server of the social network.

17. The non-transitory processor-readable medium of claim 12, wherein the request is entered via the device of the member in a comment input section of (1) a web feed of the social network, or (2) a web page of the social network and defined at least in part by the merchant.

18. A method, comprising:
 receiving, from a device of a merchant, a signal representing a request to facilitate via a social network a transfer of a product to a member of the social network, the request including transaction information and product information, the transaction information including a purchase direction statement defined at least in part by the merchant, the product information including (1) image data associated with the product, and (2) first inventory value associated with the product;
 matching the purchase direction statement to a request from a device of the member of the social network, the purchase direction statement being agnostic to the product; and
 sending, to the device of the merchant, based at least in part on the first inventory value and in response to the matching, a signal representing second inventory value associated with the product and different from the first inventory value.

19. The method of claim 18, wherein the sending the signal representing the second inventory value is at a first time, the method further comprising:
 sending, to the device of the merchant and at a second time after the first time, a signal representing a confirmation of payment for the product, and a signal representing contact information associated with the member.

20. The method of claim 18, further comprising:
 receiving from the device of the merchant a signal representing a request to generate a campaign including the product, the signal representing the request to generate the campaign including (1) a time, and (2) a date, for the campaign to be published via the social network at a web page associated with the merchant and defined at least in part by the merchant.

21. The method of claim 18, wherein the transfer includes a member portion of the transfer and a merchant portion of the transfer, the method further comprising:
 sending, to the device of the merchant and based on a signal representing completion of the member portion of the transfer, an indication of the completion of the member portion of the transfer, the indication enabling the merchant to complete the merchant portion of the transaction.

22. The method of claim 18, wherein the member is a first member, the request from the device is a first request, the method further comprising:

sending, to the device of the first member and in response to the first request, a second request to publish data via the social network indicating the first request such that a representation of the data is accessed via the social network and at a device of a second member associated within the social network with the first member, the association being selected by at least one of the first member or the second member.

* * * * *

UNITED STATES PATENT AND TRADEMARK OFFICE
CERTIFICATE OF CORRECTION

PATENT NO. : 9,477,984 B2  
APPLICATION NO. : 13/886041  
DATED : October 25, 2016  
INVENTOR(S) : Chris Bennett Page 1 of 1

It is certified that error appears in the above-identified patent and that said Letters Patent is hereby corrected as shown below:

In the Specification

Column 5, Line 56:
"FIG. 2202B" should be --FIG. 2 202B--

Signed and Sealed this
Third Day of January, 2017

Michelle K. Lee
*Director of the United States Patent and Trademark Office*